United States Patent

Casalone et al.

[11] Patent Number: 4,478,319
[45] Date of Patent: Oct. 23, 1984

[54] SPRING-APPLIED BRAKE UNIT FOR RAILWAY VEHICLE WITH MANUAL RELEASE ARRANGEMENT

[75] Inventors: Enrico Casalone; Dario Barberis, both of Turin, Italy

[73] Assignee: WABCO Westinghouse Compagnia Freni S.p.A., Turin, Italy

[21] Appl. No.: 461,777

[22] Filed: Jan. 28, 1983

[51] Int. Cl.³ .............................................. F16J 1/10
[52] U.S. Cl. .................................... 188/170; 188/202; 188/216; 92/130 A; 92/63; 92/116
[58] Field of Search ................... 188/170, 196 D, 202, 188/203, 265, 216; 92/29, 31, 32, 65, 63, 130 A, 116; 303/71

[56] References Cited

U.S. PATENT DOCUMENTS 4,063,491 12/1977 Roger et al. ........................ 92/116
4,226,168 10/1980 Staltmeir et al. ................. 188/170
4,361,078 11/1982 Cape et al. ........................ 188/170

FOREIGN PATENT DOCUMENTS 1025164 10/1974 Italy.

Primary Examiner—Douglas C. Butler
Assistant Examiner—Alvin Oberley
Attorney, Agent, or Firm—G. J. Falce

[57] ABSTRACT

A brake actuator device having a pneumatic service brake piston and a spring parking or emergency brake piston operation of either one of which effects displacement of a brake actuator rod which includes a screw-threaded spindle that operates in a non-rotatable nut member in order to adjust the length of the actuator rod. The nut member is provided with an external projection to which the vehicle brakes are mounted. A cogwheel is rotatably fixed to the actuator rod and is normally locked against rotation by a locking pin that engages the cogwheel teeth. The actuator rod is formed in two portions that are connected together through a clutch arrangement, the actuator rod portion having the threaded spindle being free to rotate during brake release to increase the actuator rod length and thereby take up the brake slack. The cogwheel may be manually released following a parking or emergency brake operation to relieve the spring-applied brake force by allowing the threaded spindle to rotate in a direction to decrease the length of the actuator rod and thereby cage the spring.

10 Claims, 1 Drawing Figure

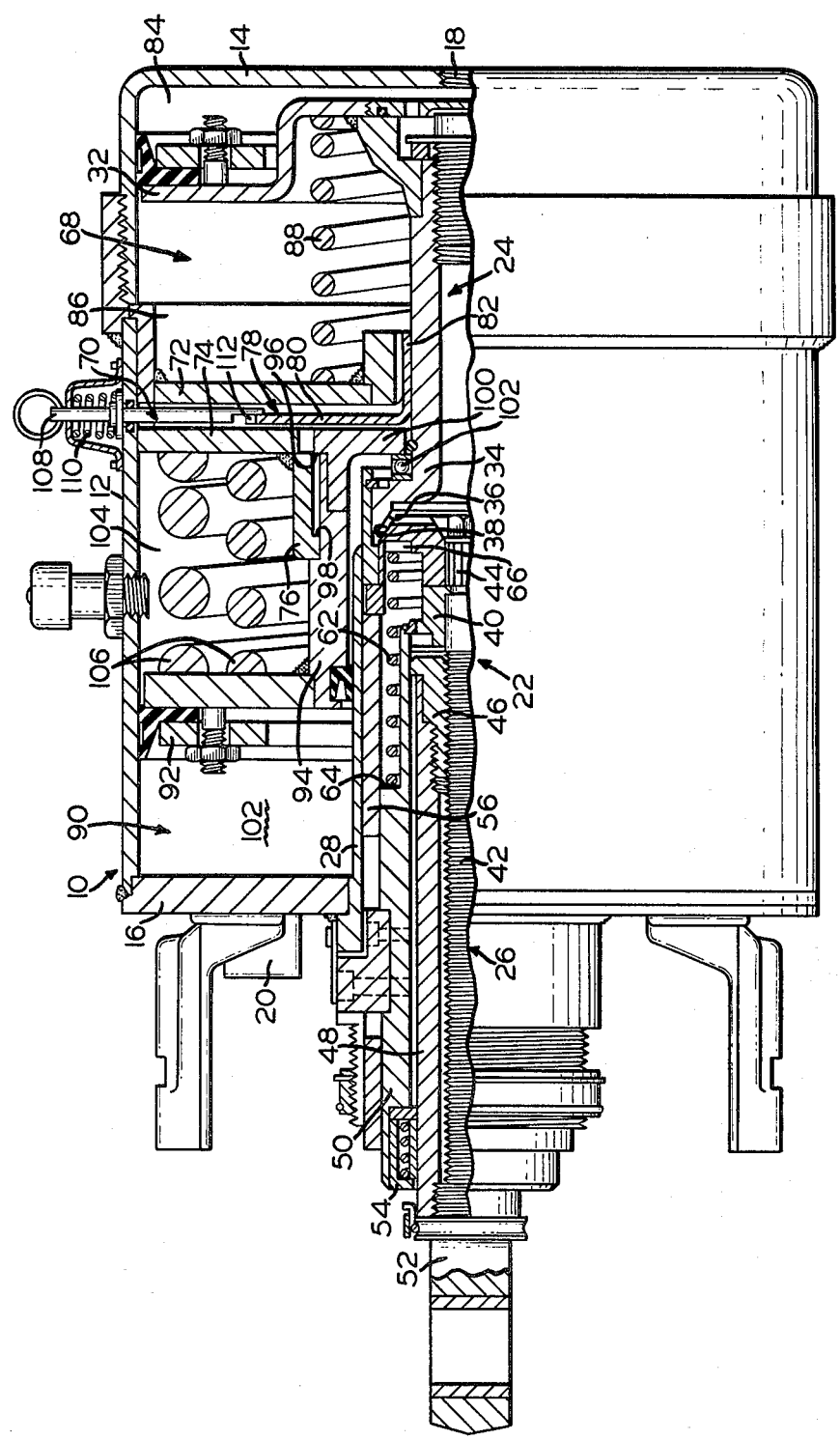

SPRING-APPLIED BRAKE UNIT FOR RAILWAY VEHICLE WITH MANUAL RELEASE ARRANGEMENT

BACKGROUND OF THE INVENTION

The present invention is concerned with a brake actuator for railway vehicles and particularly to a brake actuator arranged to couple a spring-applied parking or emergency brake to the pneumatic brake piston actuator rod.

Generally railroad properties require manual release means to be provided in conjunction with spring-applied brakes to permit a release of the spring brake. Also, a threaded spindle and nut arrangement with high pitch threads is normally employed as a means of adjusting the length of the actuator rod to compensate for brake shoe wear.

SUMMARY OF THE INVENTION

The object of the invention is to use the threaded spindle and nut arrangement of the slack adjuster to produce overtravel of the spring-applied brake piston, in order to cage the spring and thereby remove the spring force from acting on the actuator rod, when it is desired to release a spring-applied parking or emergency brake application.

Another object of the invention is to provide a manual release mechanism to initiate the spring brake release operation.

According to the present invention, a pneumatic piston operates through a brake actuator rod to apply the vehicle brakes during a service brake application. A spring actuated piston is arranged to engage a shoulder on the actuator rod to similarly apply the vehicle brakes when a parking or emergency brake application is made. The brake actuator rod is in two portions, the first having the pneumatic piston and the shoulder via which the spring piston operates. The other actuator rod portion includes a threaded spindle and nut arrangement to adjust the length of this portion of the actuator rod in order to compensate for brake shoe wear. This is accomplished by an adjusting spring acting between the spindle and nut to cause the spindle to rotate in a direction to increase the length of the actuator rod. A cogwheel rotatably fixed to the first actuator rod portion is normally engaged by a locking pin to normally prevent rotation of the first actuator rod portion. A friction clutch between the brake actuator rod portions rotatably connects the actuator rod portions together through the threaded spindle during a brake application and disengages during a brake release to permit the spindle to rotate in the event slack adjuster operation is necessitated.

Following a parking or emergency brake application, the spring-applied brake force may be released manually by withdrawing the locking pin from engagement with the cogwheel. This permits the first actuator rod portion to rotate under the axial spring force imparted by the spring-actuated piston. Since the clutch is engaged during this time, the axial force is transmitted to the threaded spindle to acuse the spindle to rotate in a direction to decrease the length of the actuator rod. By decreasing the actuator rod length, the spring piston is permitted to seat against a stop on the actuator body to thereby cage the actuator spring and accordingly release the force of the spring from the actuator rod.

DESCRIPTION AND OPERATION

Referring now to the drawing, a brake actuator device 10 is shown for a railway vehicle. The housing forming the body of actuator 10 comprises a cylinder 12 having at one end a pressure head 14 and at the opposite end a pressure head 16. The pressure heads 14 and 16 are each provided with respective inlet connections 18 and 20 to which pneumatic pressure is supplied.

A brake actuator rod 22 comprises an internal rod portion 24 that lies entirely within the body of actuator 10 and an external rod portion 26 that operates within an annular guide tube 28 within the actuator body, with one end of the external portion 26 projecting from the actuator body to receive a brake shoe or the like (not shown). The internal portion 24 of actuator rod 22 is formed with splines along its axial length, which terminate in a shank end to which a pneumatic piston 32 is attached. The other end of internal rod portion 24 is formed with an annular shoulder 34 having a conical face 36 that lies adjacent a corresponding conical face 38 of a sleeve 40 that is pressed onto the one end of a threaded spindle 42 forming a part of actuator rod portion 26.

Coupled to threaded spindle 42 is a correspondingly threaded, non-rotatable nut 46 having a hollow rod 48 fixed therewith that extends axially, so as to surround spindle 42. The spindle 42 and nut 46 cooperate to increase or decrease the length of actuating rod 22 in accordance with the degree of brake shoe wear, and thus constitute a slack adjuster device. Hollow rod 48 is provided at its external end with an attachment member 52 by means of which the aforementioned brake shoe or the like is attached. A sleeve 50 that is fixed to the body of actuator 10 surrounds hollow rod 48 and includes at its external end a friction member 54 that cooperates with hollow rod 48 to establish and maintain a predetermined brake shoe clearance. Sleeve 50 is surrounded by a tubular member 56 that, in turn, is slidably disposed within the guide tube 28. An undercut forms a shoulder 64 on sleeve 50 against which a helical spring 62 rests. The opposite end of spring 62 bears against a bearing ring 66 in sleeve 40.

Piston 32 provides a pressure-tight seal with a cylinder 68 defined by the actuator body adjacent pressure head 14 and a divider wall 70. This wall 70 is comprised of an annular wall 72 facing pressure head 14, and an annular wall 74 facing pressure head 16. Annular wall 74 is provided with an axial appendage 76 extending in the direction of pressure head 16. Annular walls 72 and 74 are spaced apart to provide an annular space 78 in which a toothed wheel 80 is disposed. Toothed wheel 80 is provided with a hub 82 which fits over the splines of actuator rod 24 in order to slide axially thereon, while being concurrently adapted to rotate with rotation of piston 32.

Piston 32 sub-divides the cylinder 68 into a first chamber 84 that communicates with connection 18, and a second chamber 86, in which a helical return spring 88 is interposed between piston 32 and annular wall 72 to urge piston 32 toward a release position, as shown.

The portion of the actuator body 10 between wall 74 and pressure head 16 comprises a cylinder 90, in which an annular piston 92 is disposed for axial movement. The outer periphery of piston 92 has sliding contact with the cylindrical portion of body 10, while the inner periphery of piston 92 is formed by a tubular rod 94 that projects toward wall 74 and has sliding contact with guide tube 28. The free extremities of tubular rod 94 and of the appendage 76 are provided with respective annular stop surfaces 96 and 98 that are spaced apart from each other in the release position of piston 92, as shown. A tailpiece 100 of tubular rod 94 is engageable with a thrust bearing 102 that fits against the annular shoulder 34 of internal actuator rod portion 24 on the side opposite conical surface 36.

Piston 92 sub-divides cylinder 90 into a first chamber 102 that communicates with connection 20 and a second chamber 104, in which a pair of helical actuator springs 106 (used for a parking or emergency brake) are interposed between piston 92 and wall 74, so as to urge piston 92 in the direction of pressure head 16.

A locking pin 108 is interposed in the space between wall portions 72 and 74 and is contained in the body 10 so as to operate radially against a spring 110. The locking pin is provided with an external handle to permit manual operation such as to retract the pin and thereby disengage the internal extremity 112 from the toothed wheel 80, with which it is normally engaged under the influence of spring 110. When the locking pin is engaged with toothed wheel 80, internal actuator rod portion 24 is locked against rotation, and when disengaged, actuator rod portion 24 is free to rotate.

In operation, chamber 102 is normally pressurized via connection 20 with compressed air supplied by means of a compressor located on board the railway vehicle, thereby keeping piston 92 in its shown position in which the parking or emergency brake actuator springs 106 are maintained under compression. In order to apply the service brakes, pneumatic pressure is supplied to chamber 84 via connection 18, thereby forcing piston 32 in the direction of wall 70 against the resistance of spring 88. Actuator rod portion 24 is forced axially with piston 32, resulting in the conical surfaces 36 and 38 becoming engaged to couple rod portion 24 to rod portion 26. Since actuator rod portion 24 is locked against rotation by locking pin 108, rod portion 26, with which rod portion 24 is coupled, is also locked against rotation. Spindle 42 and thus nut 46, as well as hollow rod 48, are thus forced axially in a brake application direction.

When the pneumatic pressure in chamber 84 is released, return spring 88 is effective to force piston 32 back toward its release position, as shown. Spring 62 is effective to maintain a force on sleeve 40 to keep conical face 38 in engagement with face 36, as piston 32 and thus internal rod portion 26 are retracted by spring 88. Consequently, spindle 42, on which sleeve 40 is pressed, and also nut 46 and hollow rod 48 are withdrawn from the braking position to a brake release position.

In the event of brake shoe wear, the excess slack is taken up during the brake release phase by the action of the friction member 54, which limits movement of the hollow rod 48 in the brake release direction to a predetermined amount that normally corresponds to the desired brake shoe clearance. As spring 62 exerts an axial force on sleeve 40, the spring force is translated by the screw threads between spindle 42 and nut 46 into rotation of spindle 42, which consequently increases the length of the external actuator rod 26 to copensate for the brake shoe wear.

In order to apply the parking or emergency brake, the pneumatic pressure in chamber 102 may be released, thereby allowing the force exerted on piston 92 by springs 106 to become effective to move the piston in the direction of pressure head 16. As piston 92 accordingly moves in a brake application direction, tailpiece 100 acting against bearing 102 picks up shoulder 34 of internal actuator rod 24, which in turn engages external actuator rod 26 via the coupling between conical faces 36 and 38. Actuator rod 22 is thus forced in a brake application direction under the force of actuator springs 106.

This spring-applied parking or emergency brake can be released either by reapplying pneumatic pressure to chamber 102 or, in the absence of pneumatic pressure, by manually releasing locking pin 108 from its normal engagement with toothed wheel 80. Since springs 106 are exerting an axial force on actuator rod 22, releasing the locking pin 108 frees internal rod portion 24 of actuator rod 22 to rotate. Since rod portion 24 remains coupled to rod portion 26 through the friction engagement between conical faces 36 and 38, the axial force of actuator springs 106 acting on rod portion 24 is transmitted to the threaded spindle 42 of rod portion 26 and effects rotation of the spindle within nut 46. Consequently, rod portion 26 is shortened in length to allow springs 106 to expand as piston 92 moves in a brake application direction with the shortening of screw member 42. When piston 92 has moved sufficiently to bring the limit stops 96 and 98 into engagement, further piston travel is terminated and springs 106 become caged, by reason of piston 92 being supported by the actuator body. In this manner, the spring force is removed from brake actuator rod 22, thereby releasing the parking or emergency brake without the need for pneumatic pressure.

Once the spring-applied brake is released, the operating handle of locking pin 108 may be released to permit spring 110 to reset the locking pin into engagement with toothed wheel 80. Upon reapplication of pneumatic pressure to chamber 102, piston 92 is forced back to its normal release position in which springs 106 are held under compression. When this occurs, spring 88 retracts piston 32 and thus rod portion 24, while spring 62 acting axially on sleeve member 44 of rod portion 26 causes spindle 42 to rotate in a direction to extend the length of rod 22, thereby restoring the brake actuator to its condition prior to operation of the spring-applied brake.

Having now described the invention, what we claim as new and desire to secure by Letters Patent, is:

1. A brake actuator for railway vehicles comprising:
   (a) a first cylinder;
   (b) a primary piston operably disposed in said first cylinder and subject to fluid pressure supplied thereto to effect operation of said primary piston in a brake application direction;
   (c) a second cylinder;
   (d) a secondary piston operably disposed in said second cylinder;
   (e) an actuator spring acting on said secondary piston to effect operation thereof in a brake application direction;
   (f) actuator rod means operable in response to said operation of either said primary and said secondary pistons in said brake application direction to produce braking on the vehicle, said actuator rod means comprising an actuator rod and means for adjusting the length of said actuator rod, said adjusting means including:
      (i) a screw-threaded, non-rotatable nut member having an externally projecting portion on which brake means may be mounted; and
      (ii) a screw-threaded spindle threadedly engageable with said nut member; and (g) means for normally locking said spindle against rotation to provide joint axial displacement of said spindle and said nut member in said brake application direction in response to said operation of either said primary piston and said secondary piston, said locking means being manually releasable to permit rotation of said spindle under the axial force of said actuator spring acting through said secondary piston during operation thereof, whereby said rotation of said spindle is in such sense as to decrease the length of said actuator rod.

2. A brake actuator device as recited in claim 1, further comprising stop means for supporting said secondary piston against the force of said actuator spring when displacement of said secondary piston exceeds a predetermined amount in response to said decrease in the length of said actuator rod.

3. A brake actuator device as recited in claim 2, wherein said stop means is integral with the casing of said brake actuator device.

4. A brake actuator device as recited in claim 1, wherein said adjusting means further comprises:
   (a) a first portion of said brake actuator rod engageable at one end with said first piston;
   (b) a second portion of said brake actuator rod separate from said first portion and comprising said nut member and said spindle;
   (c) clutch means for rotatably locking said first and second brake actuator rod portions together during displacement of said primary and secondary pistons in said brake application direction and for disengaging said first and second brake actuator rod portions during displacement of said primary piston in a direction opposite said brake application direction; and
   (d) an adjusting spring acting axially on said spindle to effect rotation thereof when said clutch means is disengaged in such direction as to increase the length of said brake actuator rod.

5. A brake actuator device as recited in claim 4, further comprising:
   (a) an annular shoulder formed on said first portion of said brake actuator rod; and
   (b) a tailpiece on said secondary piston axially aligned with said shoulder for engagement therewith in response to operation of said secondary piston by said actuator spring to thereby effect said axial displacement of said spindle.

6. A brake actuator device as recited in claim 4, wherein said locking means comprises a cogwheel rotatably fixed on said first portion of said brake actuator rod, said locking means being externally operable to engage the teeth of said cogwheel to lock said first portion of said brake actuator rod against rotation and to disengage the teeth of said cogwheel to free said first portion of said brake actuator rod for rotation.

7. A brake actuator device as recited in claim 6, further comprising an annular wall separating said first and second cylinders, said annular wall having an annular space therein in which said cogwheel is rotatably disposed and into which said locking means projects.

8. A brake actuator device as recited in claim 7, further characterized in that said brake actuator rod projects through said annular wall.

9. A brake actuator device as recited in claim 4, wherein said clutch means comprises:
   (a) a first conical surface formed on the end of said first brake actuator rod portion opposite said one end; and
   (b) a second conical surface formed on the end of said second brake actuator portion adjacent said opposite end of said first brake actuator rod portion to seat against said first conical surface and thereby frictionally lock said first and second brake actuator rod portions together for rotation cojointly upon engagement therebetween.

10. A brake actuator device as recited in claim 1, further comprising:
    (a) an annular shoulder formed on said actuator rod; and
    (b) a tailpiece on said secondary piston arranged to engage said shoulder in response to said operation of said secondary piston by said actuator spring to thereby effect said axial displacement of said spindle.

* * * * *